United States Patent
Wendt et al.

(10) Patent No.: US 11,845,602 B2
(45) Date of Patent: Dec. 19, 2023

(54) TANK AND METHOD

(71) Applicant: ArianeGroup GmbH, Taufkirchen (DE)

(72) Inventors: Christian Wendt, Bremen (DE); Gerrit Quappen, Bremen (DE); Michael Quatmann, Bremen (DE); Markus Quadt, Bremen (DE); Markus Kleineberg, Cologne (DE); Dirk Röstermundt, Cologne (DE); Jan Stüve, Cologne (DE); Daniel Stefaniak, Cologne (DE); Andreas Kolbe, Cologne (DE)

(73) Assignee: ArianeGroup GmbH, Taufkirchen (DE)

( * ) Notice: Subject to any disclaimer, the term of this patent is extended or adjusted under 35 U.S.C. 154(b) by 547 days.

(21) Appl. No.: 16/919,548

(22) Filed: Jul. 2, 2020

(65) Prior Publication Data

US 2021/0002060 A1  Jan. 7, 2021

(30) Foreign Application Priority Data

Jul. 5, 2019 (DE) .......................... 102019118323.5

(51) Int. Cl.
*B65D 81/38* (2006.01)
*B65D 88/06* (2006.01)
(Continued)

(52) U.S. Cl.
CPC ......... *B65D 81/3806* (2013.01); *B65D 88/06* (2013.01); *B65D 90/0066* (2013.01);
(Continued)

(58) Field of Classification Search
CPC ................ B65D 81/3806; B65D 88/06; B65D 90/0066; B65D 90/028; B65D 90/08;
(Continued)

(56) References Cited

U.S. PATENT DOCUMENTS 5,018,634 A * 5/1991 Le Touche ............ F17C 13/001
                                                         220/4.15
5,085,343 A   2/1992 Scarr
(Continued)

FOREIGN PATENT DOCUMENTS

CN   107228274 A * 10/2017 ................ F17C 1/12
EP    1517078 A2 * 3/2005 ................ F17C 1/12
(Continued)

OTHER PUBLICATIONS

ILK Dresen, "Kryostate aus GFK oder Metall" https://www.ilkdresden.de/projekt/kryostateausgfkodermetall/.
(Continued)

*Primary Examiner* — James N Smalley
*Assistant Examiner* — Eric C Baldrighi
(74) *Attorney, Agent, or Firm* — Greer, Burns & Crain, Ltd.

(57) ABSTRACT

A tank for the storage of liquid or gaseous substances with a fiber-reinforced plastic sheathing, which limits at least one interior space for holding the materials to be stored. At least one circumferential section of the fiber-reinforced plastic sheathing comprises an evacuable sandwich structure, which completely encloses the circumferential section. As a result, the tank has a low weight with a high thermal insulation capacity. Furthermore, a reliable explosion protection of the tank is provided. Furthermore, a method for manufacturing a tank for the storage of liquid or gaseous substances is provided.

9 Claims, 5 Drawing Sheets

(51) Int. Cl.
  *B65D 90/00* (2006.01)
  *B65D 90/02* (2019.01)
  *B65D 90/08* (2006.01)
  *B65D 90/32* (2006.01)
  *B65D 90/48* (2006.01)

(52) U.S. Cl.
  CPC .......... *B65D 90/028* (2013.01); *B65D 90/08* (2013.01); *B65D 90/024* (2013.01); *B65D 90/325* (2013.01); *B65D 90/48* (2013.01)

(58) Field of Classification Search
  CPC .... B65D 90/024; B65D 90/325; B65D 90/48; F17C 5/02; F17C 2201/0109; F17C 2201/0185; F17C 2201/032; F17C 2201/035; F17C 2201/054; F17C 2203/0391; F17C 2203/0629; F17C 2203/0663; F17C 2203/0673; F17C 2205/0305; F17C 2205/0352; F17C 2221/011; F17C 2221/012; F17C 2221/014; F17C 2223/0161; F17C 2223/033; F17C 2260/042; F17C 2270/0197; F17C 3/08; Y02E 60/32
  USPC ....................................................... 220/592.2
  See application file for complete search history.

(56) References Cited

U.S. PATENT DOCUMENTS

| | | | |
|---|---|---|---|
| 6,178,754 B1 | 1/2001 | Dujarric | |
| 6,668,561 B1 * | 12/2003 | Sheu | ........................ F17C 1/16 220/560.12 |
| 6,708,502 B1 * | 3/2004 | Aceves | ..................... F17C 3/08 220/560.08 |
| 8,919,597 B2 | 12/2014 | Handa | |
| 2004/0026431 A1 | 2/2004 | Jones | |
| 2004/0060304 A1 * | 4/2004 | Aceves | ..................... F17C 3/08 220/560.12 |
| 2007/0205201 A1 * | 9/2007 | Cundiff | ..................... F17C 1/06 220/591 |
| 2008/0256960 A1 * | 10/2008 | Greason | ..................... F17C 3/04 220/560.07 |
| 2009/0218353 A1 | 9/2009 | Tausberger et al. | |
| 2010/0059528 A1 * | 3/2010 | Zhevago | ................... F17C 1/00 141/82 |
| 2012/0205493 A1 | 8/2012 | Robinson et al. | |
| 2014/0117021 A1 | 5/2014 | Quemerais et al. | |
| 2015/0292454 A1 * | 10/2015 | Yoshida | ..................... F17C 3/04 123/445 |
| 2020/0384719 A1 * | 12/2020 | Benson | ................... B32B 5/022 |
| 2022/0403980 A1 * | 12/2022 | Backhouse | ............... F17C 1/12 |

FOREIGN PATENT DOCUMENTS

| | | | | |
|---|---|---|---|---|
| EP | 2163806 A1 | | 3/2010 | |
| EP | 2340205 A1 | | 7/2011 | |
| ES | 2399332 T3 | * | 3/2013 | ............. B64G 1/402 |
| FR | 2932243 A1 | * | 12/2009 | ................ F17C 3/06 |
| GB | 812375 | | 4/1959 | |
| JP | 2009510378 A | | 3/2009 | |
| WO | 02103127 A1 | | 12/2002 | |
| WO | 2007106035 A1 | | 9/2007 | |
| WO | 2010037561 A1 | | 4/2010 | |
| WO | 2011055652 A1 | | 5/2011 | |

OTHER PUBLICATIONS

D. McCarville, et al., "Design, Manufacture and Test of Cryotank Components" https://ntrs.nasa.gov/search.jsp?R=20170012407.
German Search Report; priority document.

* cited by examiner

TANK AND METHOD

CROSS-REFERENCES TO RELATED APPLICATIONS

This application claims the benefit of the German patent application No. 102019118323.5 filed on Jul. 5, 2019, the entire disclosures of which are incorporated herein by way of reference.

FIELD OF THE INVENTION

The invention initially relates to a tank for the storage of liquid or gaseous substances, with a fiber-reinforced plastic sheathing, which limits at least one interior space for holding the materials to be stored. An object of the invention furthermore comprises a method for manufacturing such a tank for the storage of liquid or gaseous substances.

BACKGROUND OF THE INVENTION

Launch vehicles for commercial or military payloads are frequently equipped with engines that are operated using liquid and cryogenic fuel components, such as hydrogen/oxygen. Constructionally simpler designed solid-fuel engines are difficult to regulate compared to liquid-fuel engines and usually only fire up once. Tanks with a high thermal insulating capacity, low permeability or a high level of leak-tightness and a low weight are required for the storage of liquid or gaseous and often cryogenic fuels or fuel components. In addition, such tanks must have the most effective explosion protection due to the highly explosive fuels stored in them.

In the case of the upper stages of launch vehicles currently in operation, metallic cryogenic tanks made of aluminum and, in rarer cases, using structures made of carbon-fiber reinforced plastics (CFRP) are used in monolithic embodiments. In general, two spatially completely separated tanks are used for storing one fuel component at a time. Controlling low fuel temperatures requires a separate thermal insulation concept that causes additional dry matter, production costs and complexity. Thermal foam insulation increases the weight of the tank without contributing to its structural stability. In addition, while such foam insulation effectively reduces convective heat transport on the ground, it is far less suitable for reducing heat transport due to radiation in space than appropriately coated surfaces or systems of coated surfaces, such as a so-called "multilayer insulation (MLI)". The limitation of the permeability and leakage in tanks made of fiber-composite plastics is often carried out by increasing tank wall thicknesses and/or the using additional metallic liners or cladding, coatings or films, which also leads to an increase in weight, system complexity and thus manufacturing costs.

In addition, vacuum-insulated tanks or cryostats made of stainless steel or glass-fiber reinforced plastics (GFRP), as well as less frequently made of carbon-fiber reinforced plastics from the prior art are known (cf.: https://www.ilk-dresden.de/projekt/kryostateausgfkodermetall/). These tanks are designed for very low evaporation rates and also have a low permeability rate in the case of using fiber-reinforced plastics (FRP). However, the walls of these tanks have a comparatively high level of material thickness to achieve these properties in such a way that the tanks are generally unsuitable for space applications.

Furthermore, tanks are known for rocket applications made of fiber-composite plastics, in which a sandwich structure is provided only in simply curved zones or hollow cylindrical sections of the tank. These structures are flushed with an inert gas to ensure adequate explosion protection (cf.: "Design, Manufacture and Test of Cryotank Components" McCarville, 2017). For effective flushing to take place, smaller vacuum pumps can also be used at the outlet of the flushing ducts, but they do not pursue intention of achieving a permanently thermally insulating vacuum within the sandwich structure in order to avoid a separate insulation concept (cf.: Patent US 2012/0205493 A1 [0124]).

SUMMARY OF THE INVENTION

One object of the invention is to provide an improved tank for storing liquid or gaseous substances for a spacecraft, such as a rocket or rocket stage, which has good thermal insulating capacity and a reduced weight, in conjunction with an effective explosion protection. Furthermore, it is an object of the invention to specify a method for the optimized production of such a tank.

The above-mentioned object is initially solved in that at least one circumferential section of the fiber-reinforced plastic sheathing has an evacuable sandwich structure, which completely encloses the circumferential section. By means of this, the tank has a largely weight-neutral thermal insulation, which simultaneously ensures excellent explosion protection. In general, sufficient explosion protection is already guaranteed below 1.0 hPa (see so-called "explosion limit"). For the purpose of thermal vacuum insulation, the evacuable sandwich structure of the tank is applied using a significantly lower pressure, which is preferably within a range between 0.0001 hPa and 0.01 hPa. The evacuable and preferably load-bearing sandwich structure preferably extends axially on both sides across the one circumferential section of the tank and can, for example, form an outer shell of a rocket or a rocket stage to be equipped with the tank, at least in sections. The evacuable and load-bearing sandwich structure is preferably segmented along its circumference, wherein the segments are connected in the longitudinal direction in a pressure-tight manner Preferably, the at least one circumferential section is a center circumferential section, to which an end-side circumferential section adjoins on both sides respectively, which is respectively covered with an evacuable external structure. This completes the thermal insulation and explosion protection of the tank at the end side.

In the case of advantageous further embodiment, the interior space is divided by an evacuable separation bulkhead to create a first and a second chamber. As a result, a storage of two different liquid or gaseous substances or fuels or fuel components, such as hydrogen and oxygen, is possible.

Preferably, the center circumferential section and the two end-side circumferential sections are formed with a fiber-composite plastic. This results in a considerable weight reduction in the magnitude of up to 40% compared to a conventional metallic tank.

In the case of a further embodiment, the evacuable sandwich structure is firmly connected to the center circumferential section and is designed to be load-bearing. As a result, in addition to its main functionality, the tank can simultaneously take on structurally relevant loads.

Preferably, the evacuable external structures of the two end-side circumferential sections with a structurally simplified sandwich structure, in particular, with a spaced-away membrane and/or with a support structure constructed using a fiber-composite plastic, are formed. This provides effective thermal vacuum insulation as well as explosion protection of the end-side circumferential sections of the tank. The evacuable external structures of the final circumferential sections of the tank preferably do not have any significant load-bearing function.

In a favorable further embodiment, each of the two end-side circumferential sections respectively has a connection piece with a flange directed in the direction of the interior space, wherein the flanges are each firmly connected to the respectively associated end-side circumferential section by means of a connection element made using a fiber-reinforced plastic. Due to the low thermal expansion typical of fiber-reinforced plastics, mechanical stresses are reduced to a minimum due to possible temperature differences. The connection elements are preferably designed as so-called circular "dome rings", which are glued to the flanges of the connection pieces in pole regions of the approximately dome-shaped, end-side end sections of the plastic sheathing. The flanges are preferably each firmly connected to the respectively associated end-side circumferential section by means a connection element made using a glass-fiber reinforced plastic or using a carbon-fiber reinforced plastic.

In a technically favorable further embodiment, it is provided that the evacuable sandwich structure of the center circumferential section, the evacuable external structures of the two end-side circumferential sections, as well as the evacuable separation bulkhead are connected to at least one connection line for evacuation. As a result, for example, the necessary thermal insulation, as well as the explosion protection of the tank, can be ensured by means of at least one vacuum pump by applying a vacuum in the range between 0.0001 hPa and 0.01 hPa to the external structures. In addition, an inert flushing gas can be supplied via at least one connection line or a further connection line.

According to a further advantageous embodiment, the center circumferential section comprises a first hollow cylinder section and a second hollow cylinder section, whose free end sections facing each other are joined together by means of a preferably radially internal connection sleeve for the creation of the plastic sheathing, wherein the evacuable separation bulkhead is, for its part, internally connected to the connection sleeve. This allows the tank to be implemented with only one connection zone.

In a further embodiment, the end-side circumferential sections are formed integrally with the center circumferential section and are each directed away from the connection sleeve and essentially designed in a dome-shaped manner. This results in an excellent compressive strength of the tank with a minimum installation space requirement.

In the case of a further technically advantageous further embodiment of the tank, the first chamber comprises an extraction and filling line and the second chamber comprises a compression and decompression line. By means of the extraction line associated with the first upper chamber and the second lower connection piece associated with the second lower chamber, an individual extraction of the liquid or gaseous substance out of the chambers or a loading of the fluid or the gaseous material is possible, thereby being independent of one another. By means of the upper, first connection piece and the compression and decompression line associated with the second lower chamber, an individual application of a pressure cushion and/or a ventilation onto the two chambers is possible.

According to a favorable technical embodiment, the evacuable sandwich structure of the center circumferential section, the evacuable external structures of the end-side circumferential sections, as well as the evacuable separation bulkhead comprise electrical or optical cables and/or sensors. As a result, there is no need for subsequent installation of the sensors in the inner region of the tank. Preferably, all electrical and optical cables are laid in the sandwich structure in such a way that separate cable ducts can be dispensed with.

Preferably, at least the evacuable sandwich structure of the center circumferential section is modified in the region of the vacuum by means of optical coatings, a multilayer insulation and/or an opacifier in such a way that a heat transport due to radiation is effectively reduced. By means of this, the thermal insulation of the can be further optimized. A multilayer insulation or so-called "multilayer insulation" or "MLI" usually comprise a plurality of films arranged on top of each other, which are also vaporized with a metal coating. For the space of the films within the stacking arrangements, a suitable embossing of the foils, fabric, gauze or the like serve as intermediate spacer element. Such a "multilayer insulation" as an additional thermal insulation material can reduce the undesirable heat transport due to radiation particularly effectively.

Furthermore, the aforementioned method for the manufacturing a tank for the storage of liquid or gaseous substances is characterized by the following method steps:

a) prefabricating two preferably volume-different and essentially identical tank blanks with a composite-fiber plastic;

b) severing the first and second tank blanks transversely to their longitudinal central axes into a first and a second tank component of the first tank blank as well as a first and second tank component of the second tank blank, and c) combining one tank component of the first tank blank and one tank component of the second tank blank respectively into a first and a second tank.

This ensures particularly simple manufacturing suitable for series production of the tanks. The two tank blanks each have a geometry that corresponds to that of a hollow cylinder with spherical layer-shaped end-side circumferential sections, each of which have a circular opening for receiving a connection piece with a connection element from a fiber-composite plastic for being glued in. The openings of the spherical sections have a significantly reduced diameter compared to the diameter of the hollow cylindrical sections of the tank blanks.

In the case of technically favorable embodiment, it is provided that a load-bearing and an evacuable sandwich structure is applied to at least one center circumferential section of each tank. This provides all-round thermal insulation of the tank, which simultaneously ensures reliable explosion protection. The center circumferential sections of each tank each have an approximately hollow cylindrical geometry, while the end-side circumferential sections of each tank are essentially curved or dome-shaped or convexly curved outwardly in a two-dimensional manner.

In the case of an advantageous further embodiment of the method, an evacuable external structure is applied to each of the two end-side circumferential sections of each tank. This further optimizes the thermal insulation and explosion protection of the tank. The evacuable external structures of the end-side circumferential sections have essentially no relevant mechanical load-bearing capacity in contrast to that of the sandwich structure of the center circumference sections. The manufacturing process of the tank can be simplified by omitting, at least in sections, the evacuable external structure in the region of the two end-side circumferential sections or the dome caps. If necessary, a non-evacuable, compact or monolithic external structure, for example, in the form of a coating, a covering, an encasement, etc. without evacuable cavities can be provided as a substitute. The coating, the layer or the encasement are again preferably formed by means of a fiber-reinforced plastic.

In a favorable embodiment, the first tank component of the first tank blank and the second tank component of the second tank blank, as well as the second tank component of the first tank blank and the first tank component of the second tank blank are joined together by means of a preferably radially internal connection sleeve respectively. This makes it easy to create two separate tank spaces, each of which can have a different capacity. At the same time, the tank can be implemented with a double chamber and only one connection zone.

Preferably, before or during method step c), inside at each connection sleeve of the two tanks, an evacuable separation bulkhead for the creation of a first and second chamber is arranged in each of the two tanks. As a result, the interior space of the tank can be easily separated into two or more fully separated chambers for storing different liquid or gaseous substances or fuel components.

In a favorable embodiment of the method, the prefabrication of the first and second tank blanks at method step a) is carried out by means of a fiber placement method, in particular, an AFP method or a winding method. As a result, the tank can be manufactured using a sophisticated and proven technology. In the context of the present description, the term of a fiber placement process is understood to mean both the so-called AFP method (="Automated Fiber Placement") as well as winding methods in general. Preferably, the AFP method is used here, in which pre-impregnated reinforcement fiber strands are deposited on a suitable rotating winding core in a fully automatic manner and in a progression that is appropriate for the load flow. For this purpose, the mold core has a surface geometry that essentially corresponds to the interior space of the tank to be created. Here, the deforming of the finished laminated tank blanks from the mold core is carried out by means of the cutting at method step b). Furthermore, the winding method can be used, in which pre-impregnated reinforcement fiber strands are deposited on a suitable rotating winding core in a fully automatic manner and in a progression that is appropriate for load flow. For this purpose, the winding core has a surface geometry that corresponds substantially to the interior of the tank to be created. The deforming of the finished tank blanks is again carried out by means of severing at method step b).

In an advantageous further embodiment of the procedure it is provided that at method step a) each of the two end-side circumferential sections of the two tank blanks is provided with a connection piece. As a result, a mechanically particularly robust integration of the metallic connection pieces into the later tanks is guaranteed.

BRIEF DESCRIPTION OF THE DRAWINGS

In the following, a preferred exemplary embodiment of the invention will be explained in detail based on of schematic figures.

DETAILED DESCRIPTION OF THE PREFERRED EMBODIMENTS

Figure 1:
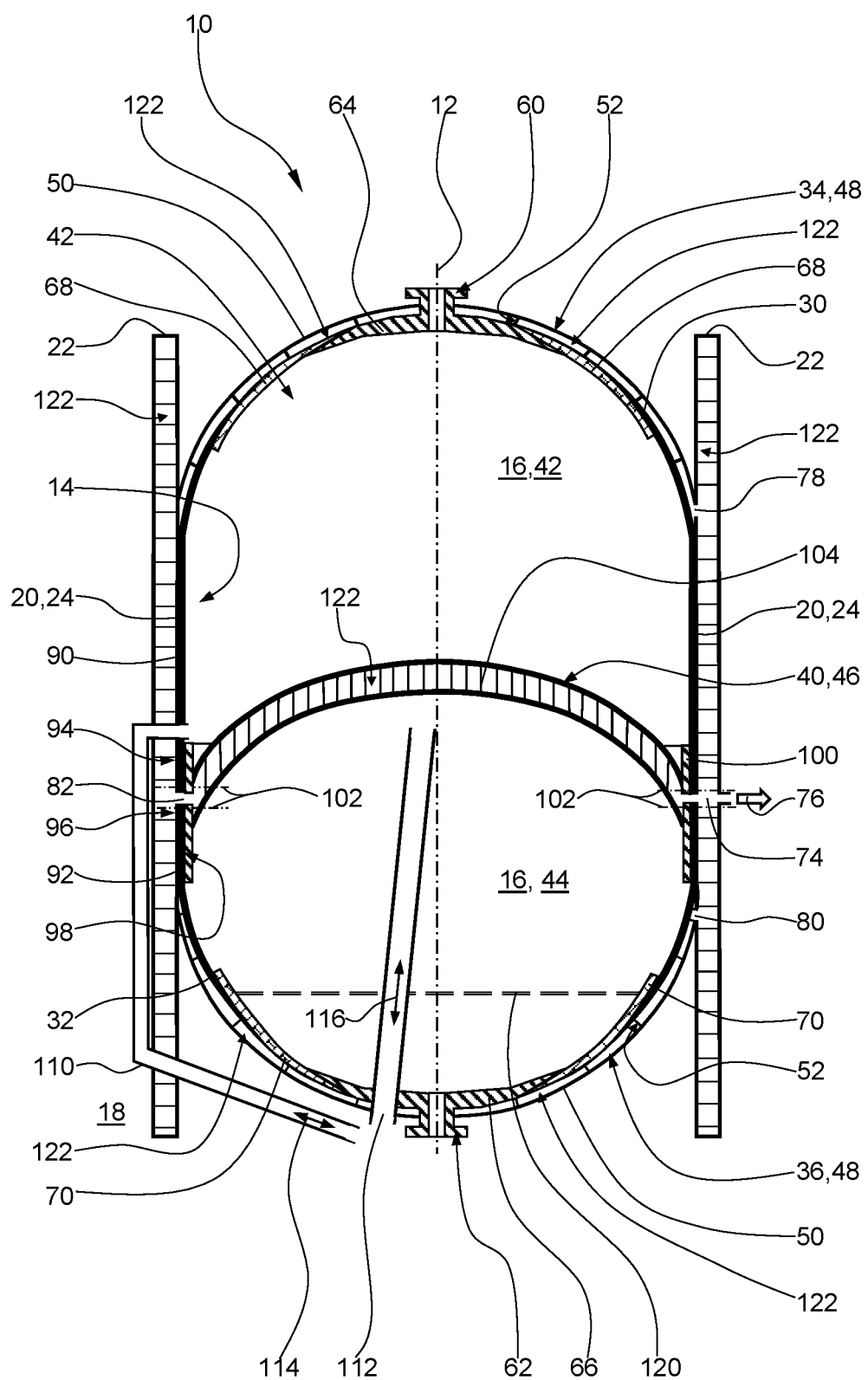
FIG. 1 shows a schematic longitudinal section through a tank according to the invention.

FIG. 1 illustrates a schematic longitudinal section through a tank according to the invention.

A tank 10 for the storage of liquid or gaseous substances is designed to be rotationally symmetrical to a longitudinal center axis 12 and comprises, among other things, a fiber-reinforced plastic sheathing 14, which limits at least an interior space 16 for holding the substances to be stored against the external environment 18.

At least one circumferential section 20 of the fiber-reinforced plastic sheathing 14 has an evacuable and preferably load-carrying or load-bearing sandwich structure 22. Here, the circumferential section 20 is only exemplified as a center circumferential section 24. A first and second end-side circumferential section 30, 32 formed, which are each provided with an evacuable but not substantially load-bearing external structure 34, 36, are axially formed on both sides of the center circumferential section 24. Both the center circumferential section 24, as well as the two end-side circumferential sections 30, 32, are formed with a solid, monolithic fiber-composite plastic such as CFRP, GFRP or CRFP, etc. The load-bearing, evacuable sandwich structure 22 is firmly mechanically connected to the center circumferential section 24 and is also made using a fiber-composite plastic.

The interior space 16 of the tank 10 is divided into a first chamber 42 and a second chamber 44 by means of an equally evacuable separation bulkhead 40 in such a way that, in each chamber 42, 44, another liquid or gaseous substance, such as hydrogen or oxygen can be securely stored for a consumer, such as a rocket engine. By means of the separation bulkhead 40, an uncontrolled chemical reaction of the different substances or liquids accommodated in the chambers 42, 44 is ruled out. In the exemplary embodiment shown here, the evacuable separation bulkhead 40 is spherically curved or convexly bent in the direction of the first chamber 42. Alternatively, the separation bulkhead 40 can also be designed to be flat at least in sections. The evacuable separation bulkhead 40 is implemented here with a permeable sandwich structure 46 made using a fiber-composite plastic.

The evacuable external structures 34, 36 at the end-side circumferential sections 30, 32 are constructed with a structurally simplified sandwich structure 48. The spacing between the end-side circumferential sections 30, 32 of the plastic sheathing 14 and a membrane 50 for the creation of the structurally simplified sandwich structure 48 can be carried out, for example, using a light support structure 52 in the form of a perforated honeycomb mat or with a lattice structure made using a plastic reinforced with Aramid® fibers for thermal insulation. Here, the lightweight support structure 52 of the evacuable external structures 34, 36 is designed in such a way that the membrane 50 is sufficiently radially spaced at a defined spacing to the plastic sheathing 14 of the tank 10 even in the evacuated state. The structurally simplified sandwich structure 48 can be designed differently if required with respect to the thermal insulation capacity and/or the mechanical load-carrying capacity in the end-side circumferential sections 30, 32 of the tank 10, in particular, depending on the physicochemical properties of the liquid or gases held in the chambers 42, 44. The two end-side, constructively complex evacuable external structures 34, 36 can optionally also be omitted for the simplification of the manufacturing process of the tank 10 or be formed at least in sections by monolithic or compact external structures, coatings, coverings or the like (not shown in the drawings), meaning not having evacuable cavities, which are preferably made using a fiber-reinforced plastic.

In FIG. 1, the two end-side circumferential sections 30, 32 or so-called "domes" are merely designed approximately dome-shaped or two-dimensionally curved or spherically/convexly curved circumferential sections.

The first end-side circumferential section 30 also comprises a solid first connection piece 60, and the second end-side circumferential section 32 comprises a solid connection piece 62 accordingly. The two pipe-like connection pieces 60, 62 are axially orientated away from one another facing away from the interior space 16 or symmetrically mirrored with relation to separation bulkhead 40. Each of the two connection pieces 60, 62 each comprises a large flange 64, 66 or a pole cap for connecting to the plastic sheathing 14 of the tank 10 over a large region. The two flanges 64, 66 are each firmly connected to the respective end-side circumferential section 30, 32 of the tank 10 by means of a connection element 68, 70, thereby preferably producing a shaft, in particular, being glued. The connection elements 68, 70 or the dome rings made with a sufficiently electrically conductive, fiber-reinforced plastic such as CFRP or GFRP have an essentially circular shape in the non-installed state, meaning in the state non-draped state. By using a glass-fiber reinforced plastic for the connection elements, mechanical stresses can also be minimized due to the extreme temperature differences occurring in the operation of the tank 10. The two connection piece 60, 62 can be made with a solid metal such as aluminum, magnesium, titanium, stainless steel, with a fiber-composite plastic such as GFRP, CFRP, etc. or with a combination of these materials or materials, wherein the flanges 64, 66 are each designed as a single piece to form the connection pieces 60, 62. The two connection pieces 60, 62 preferably comprise an industry-standard interface for fluidically coupling to pipelines (not shown) of the spacecraft, in particular, a rocket or a rocket stage.

The structurally simplified sandwich structure 48 of the end-side circumferential sections 30, 32 preferably extends to the connection pieces 60, 62, thereby using the flanges 64, 66 and the connection elements 68, 70 at least in sections. Instead of a foil-like membrane shell, the membrane 50 can also be implemented with a thin-walled CFRP structure, etc. The membrane 50 is connected to the at least partially load-bearing, center circumferential section 24 of the tank 10 in an airtight manner, in particular, being glued or welded.

The evacuable external structures 34, 36, the evacuable sandwich structure 22 of the center circumferential section 24, as well as the evacuable separation bulkhead 40, can be connected by at least one connection line 74 with a vacuum pump (not shown) and can be evacuated to a pressure of 0.01 hPa to 0.0001 hPa, as indicated by the white arrow 76. For this purpose, the evacuable components listed above are connected by means of aligning holes or ducts, of which, here, only three ducts 78, 80, 82 are shown and designated for a better illustrational overview. In addition, the evacuation can be carried out by means of at least one annular duct (not drawn in) running transversely to the longitudinal center axis 12 in the region of the evacuable sandwich structure 22, which pneumatically or fluidically connects continuous ducts within the sandwich structure 22. Accordingly, such annular ducts can also be provided in the region of the evacuable external structures 34, 36 of the dome-shaped end-side circumferential sections 30, 32 of the tank 10, as well as in the region of the evacuable separation bulkhead 40. In addition, the evacuation of the sandwich structure 22 can also be carried out indirectly via the separation bulkhead 40 (the so-called "common bulkhead") or the evacuable external structures 34, 36 of the dome-shaped end-side circumferential sections 30, 32 of the tank 10. As a result, the tank 10 according to the invention has excellent thermal insulation near the ground under atmospheric conditions, wherein an excellent explosion protection is given.

The cylindrical, evacuable sandwich structure 22 is preferably formed using at least six shell-like sandwich plate segments (not shown in FIG. 1) circumferentially lined up in a row with one another and joined in a pressure-tight manner in the longitudinal direction of the tank 10 (cf. FIGS. 2 to 7).

The center circumferential section 24 of the tank 10 comprises a first and a second hollow cylinder section 90, 92, whose free end sections 94, 96 are firmly joined together by means of a preferably radially inner and approximately hollow cylindrical connection sleeve 100 for the creation of the plastic sheathing 14, wherein the separation bulkhead 40 is, in turn, is radially connected internally for its part or is connected to an inner side 98 of the tank 10 using the connection sleeve 100, for example being glued to this. The firm joining of the hollow cylinder sections 90, 92 by means of the connection sleeve 100 including the evacuable separation bulkhead 40 preferably takes place by means of gluing or welding and, as well as complementarily with the aid of a plurality of connection elements 102 arranged evenly spaced away from each other along the circumference, such as bolts, rivets or the like (here merely illustratively indicated, however). The sandwich structure 46 of the separation bulkhead 40 has an evacuable core structure 104.

The end-side circumferential sections 30, 32 are designed as a single piece to form the center circumferential section 24 by means of a fiber placement method, in particular, in the form of the known AFP method or the wrapping method, during the course of the (manufacturing) method according to the invention and, here, are each axially directed away from the connection sleeve 100 and are curved or are approximately dome-shaped in a two-dimensional manner.

Cover layers (not shown) of the separation bulkhead 40 can be produced, for example, by means of the well-known AFP method or placing suitable cuts by means of the pick-and-place method, which are equally known to a person skilled in the art working in the field of fiber-composite plastics. For example, perforated "honeycomb" mats, so-called "fluted-core" or "corrugated-core" structures made of CFRP, can be used for the permeable sandwich structure 46 or the evacuable core structure 104 of the separation bulkhead 40. The separation bulkhead 40, preferably curved for reasons of stress distribution in pressure vessels, is cured in an autoclave on a correspondingly geometrically formed mold and glued to the connection sleeve 100 for example, which can take place by means of at least one circumferential adhesive seam or the like (not shown for the sake of a better illustrative overview).

The upper, first chamber 42 has, in addition to the first connection piece 60, an extraction line 110, while the lower, second chamber 44 comprises a compression and decompression line 112 in addition to the second connection piece 62. The compression and decompression of the chamber 42 is carried out by the upper, first connection piece 60, whereas the loading with the liquid or gaseous substance and the extraction of the liquid or gaseous substance as indicated with the black double arrow 114 is carried out by the extraction and filling line 110 running partially parallel to the longitudinal axis 12 in sections. The compression and decompression of the lower, second chamber 44 is carried out as indicated with the black double arrow 116 via the compression and decompression line 112 running slightly obliquely upward with reference to the longitudinal center axis 12 while loading or unloading via the lower, second connection piece 62 is carried out. In general, a material thickness of the sandwich structure 22 of the center circumferential section 24 of the tank 10 is at least 30 mm. In the case of at least partial integration of the extraction line 110 into the sandwich structure 22, an increase in the material thickness of the sandwich structure 22 may be required. In the event that the sandwich structure 22 comprises a continuous folded honeycomb structure in the axial direction, to ensure the required flow cross-section for replacing the extraction line 110, a plurality of folded honeycomb ducts running along the longitudinal center axis 12 can be fluidically connected in parallel within the sandwich structure 22 in such a way that an increase in material thickness may be unnecessary under certain circumstances. By means of at least one partial integration of the extraction line 110 into the sandwich structure 22, the aerodynamic characteristics of the cylinder sandwich structure 22 generally forming an outer skin of a spacecraft (not shown), such as a rocket or a rocket stage, can be further optimized.

Furthermore, a plurality of electrical and optical lines (also not shown here for the sake of a better illustrative overview) can be integrated within all evacuable components of the tank 10, such as, in particular, the center circumferential section 24, the two end-side circumferential sections 30, 32, as well as within the evacuated separation bulkhead 40. The same applies to electronic sensors. The core structure of the evacuable components mentioned above can form the cable ducts for the cables and the sensors. In addition or as an alternative, cable ducts may be drawn into the core structures of the evacuable components at least in sections.

The evacuable sandwich structure 22 and/or the evacuable external structures 34, 36 of the tank 10 are preferably modified in the region of a vacuum 122 by means of suitable optical coatings, a "multilayer insulation," or an opacifier, in such a way that the heat transport due to radiation is effectively reduced.

Above the flange 66 of the second connection piece 62 in the region of the connection element 70 in the second chamber 44, a control system 120 is provided for the stored liquid or gaseous substance, which may have a sieve- or grid-like spatial structure.

Figure 2:
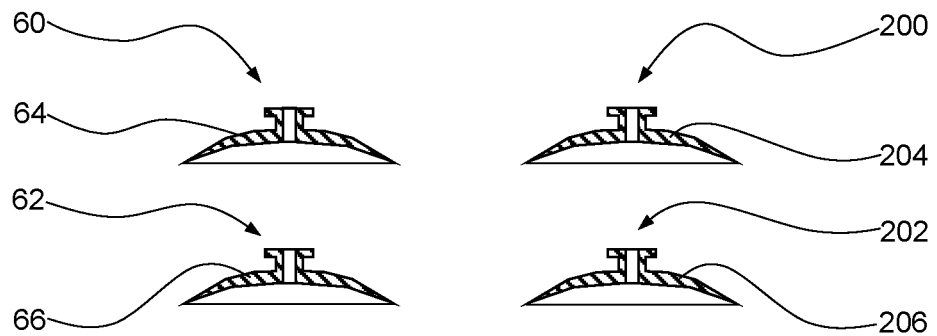
FIGS. 2-7 show a schematic view of a method for manufacturing the tank in FIG. 1.
Figure 3:
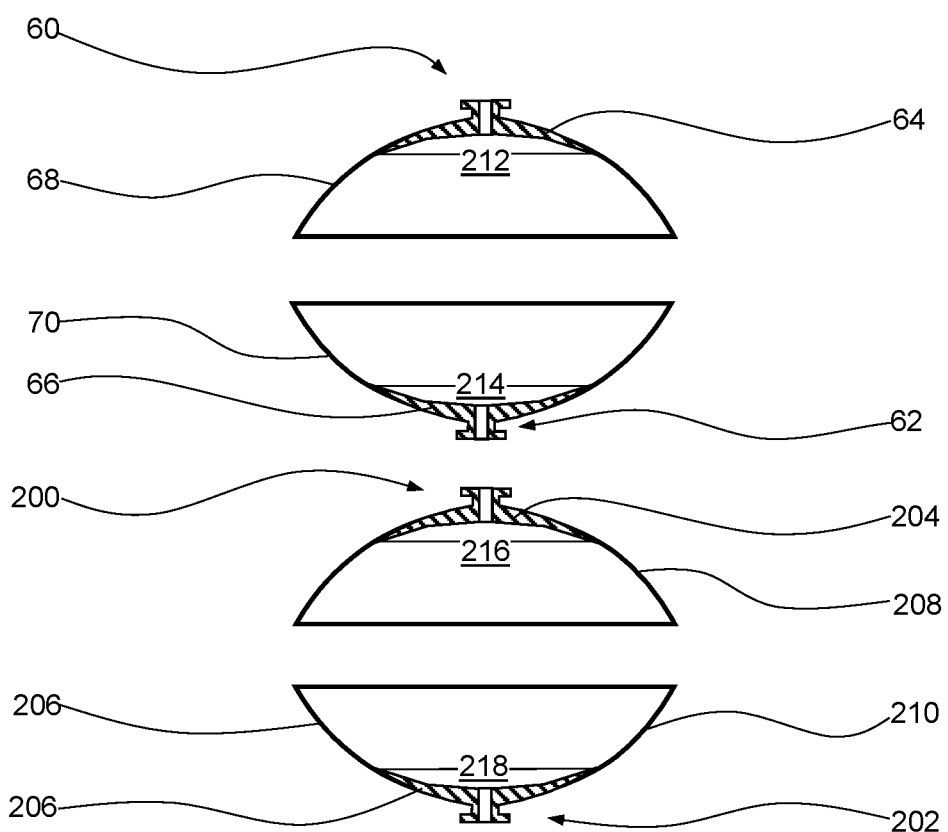

FIGS. 2 to 7 illustrate a schematic representation of a method according to the invention for the preparation of the tank in FIG. 1. FIG. 2 shows the two connection pieces 60, 62 from FIG. 1, as well as two further, constructively identically constructed connection pieces 200, 202 approximately spherical flanges 204, 206 formed as a single piece on it, which are used for the mechanical connection to the tank with the aid of connection elements (cf. FIG. 3 reference numbers 68, 70, 208, 210). These connection elements and "dome rings" generally have a circular geometry in the non-installed state. In the illustration of FIG. 3, the connection elements 68, 70 and 208, 210 are already spherically draped and connected to the flanges 64, 66, 204, 206 in a suitable manner, thereby creating a mounting to one another, in particular, being glued or welded.

The connection pieces 60, 62, 202, 202, which are glued to the connection elements 68, 70, 208, 210 each establish a prefabricated connection assembly 212, 214, 216, 218, each of which is handled as a single unit.

Figure 4:
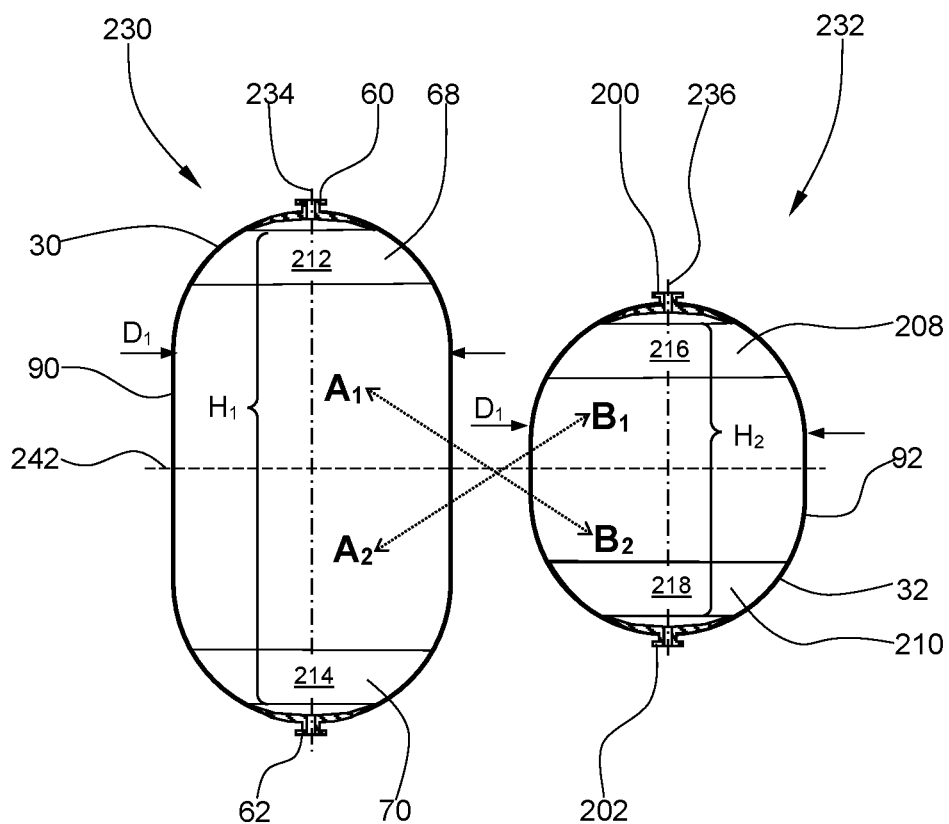
Figure 5:
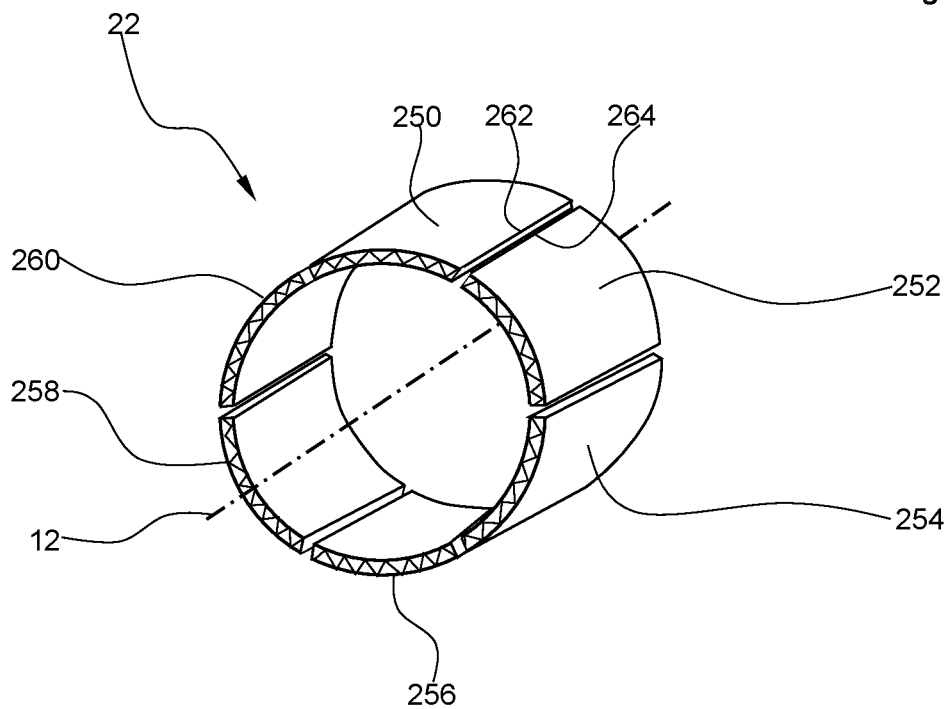

On the basis of FIGS. 4, 5 to which is also referred to in the further progression of the description, the principal course of the method according to the invention is to be explained in more detail. The four connection assemblies 212, 214, 216 and 218 are already integrated into tank blanks 230, 232 or glued to them in accordance with FIG. 4 within the scope of the method.

At a first method step a), two tank blanks 230, 232, which are preferably different in volume, however essentially identical in diameter (+/−2%), are each prefabricated with a diameter D1 using a fiber-composite plastic, such as CFRP. This can be done, for example, by winding or depositing a strand or band-shaped carbon-prepreg material on a rotating mold core during the winding method or when depositing onto a still or rotating mold core by means of the known AFP method.

The connection pieces 60, 62, 200, 202 with the connection elements 68, 70, 208, 210, which together form a connection assembly 212, 214, 216, 218, can be applied to the core tools for this purpose before starting the fiber placement process in such a way that the connection pieces 60, 62, 200, 202 simultaneously serve to rotatably clamp the core tools into a turning device (not shown in the drawings) for the mold core. In such a constellation, a so-called "co-bonding" process of the connection assemblies 212, 214, 216, 218 with the tank blanks 230, 232 takes place during the course of curing of the carbon-prepreg material or the CFRP after the depositing or wrapping process has been completed. In order to increase the leak-tightness of the later tanks, individual layers are implemented using a so-called "thin-ply" prepreg material during the prefabrication of the tank blanks 230, 232 during the fiber placement process.

A geometry of the not shown mold core for the tank blanks 230, 232 essentially corresponds to a cylinder, whose two end faces or end faces are curved outwardly in a two-dimensional manner or approximately spherical or dome-shaped. An axial height H1 of the first tank blank 230 is preferably greater than an axial height H2 of the second tank blank 232. By means of the fiber placement or winding method, the first and the second hollow cylinder section 90, 92 as well as the dome-shaped end-side circumferential sections of the later tank to be manufactured are formed (cf. FIG. 1, reference numbers 10, 30, 32).

At a second method step b), the tank blanks 230, 232 are each completely severed along a section line 242 running transversely to their respective longitudinal central axes 234, 236, whereby four tank components A1,2 as well as B1,2 or tank halves result. The separation process also allows for the deforming of the tank components A1,2 and B1,2 by the forming cores of the fiber placement machine. In the course of the separation process, the first tank blank 230 is broken down into a first and a second tank component A1,2 and the second tank blank 232 is divided into a first and a second tank component B1,2.

In order to ensure adequate electrical insulation of the connection piece 60, 62, 200, 202 and a strain compensation in the case of the operationally high temperature differences between the metallic components and the components manufactured using fiber-composite plastics, the connection elements 68, 70, 208, 210 are preferably made using a glass-fiber reinforced plastic (GFRP). For the production of the connection elements 68, 70, 208, 210 that preferably are draped in two spatial directions, cuts of a fabric, a multi-axial layer, etc. can be used, which are draped on a correspondingly spherically curved mold (not shown) and, for example, are processed by means of a resin infusion method, and then cured.

The gluing of the connection elements 68, 70, 208, 210 or the dome rings with the flanges 64, 66, 204, 206 or the pole caps of the connection pieces 60, 62, 200, 202 with the end-side circumferential sections of the two tank blanks 230, 232—of which only the end-side circumferential sections 30, 32 of the finished tank in FIG. 1 are designated here—may also take place in a manner deviating from the co-bonding process explained above in the fiber placement of the two tank blanks 230, 232, meaning after the completion of the fiber placement process, the curing of the manufactured tank blanks 230, 232 and the combining of the four tank components A1,2 and B1,2 into two tanks. At a third and end-side method step c), the four tank components A1,2 and B1,2 are joined together for form the tank 10 in FIG. 1 and into another second tank, (not shown for the sake of a better illustrational overview), which can be done, for example, by means of gluing, welding and/or with the aid of connection elements, such as rivets, bolts, clamps, etc. It is essential in this context that the prefabricated tank components A1,2 and B1,2—into which the connection assemblies 212, 214, 216, 218 are respectively integrated—joined together in a "crossed-over manner", that is, the first tank component A1 of the first tank blank 230 forms, for example, the tank 10 in FIG. 1 together with the second tank component B2 of the second tank blank 232 and the second tank component A2 of the first tank blank 230 forms the second tank (not shown in the drawings) together with the first tank component B1 of the second tank blank 232.

FIG. 5 illustrates the production of the evacuable sandwich structure in a simplified perspective view (in particular, see FIG. 1, reference number 22).

The evacuable sandwich structure 22 comprising an approximate hollow cylindrical geometry is formed using six sandwich segments 250 to 260 arranged along the circumference here only as an example. A number of sandwich segments deviating from this is also possible. The preferably constructively identical sandwich segments 250 to 260 are positioned for the creation of the evacuable sandwich structure evenly distributed along the circumference on the center circumferential section of the tank to be equipped with it, such as the tank 10 in FIG. 1, and is firmly connected to this, which can be done, for example, by means of gluing, welding, etc. At the same time, the opposite longitudinal edges running respectively parallel to the longitudinal center axis 12 of the later tank (not referenced in FIG. 5 for the sake of a better illustrational overview),—of which only two longitudinal edges 262, 264 of the sandwich segments 250, 252 are referenced for the sake of a better illustrative overview—are connected to each other in a vacuum-tight manner, thereby creating a longitudinal seam (cf. FIG. 7, reference number 270), which can take place, for example, by means of gluing, welding, etc.

The six sandwich segments 250 to 260 can, in turn, be made of CFRP prepreg covers by means of the AFP method and/or the pick-and-place process with deformable, perforated "honeycomb" mats and/or with "fluted-core" structures made of CFRP or with a plastic core reinforced with Aramid® fibers to optimize thermal insulation using a suitable, cylindrical curved tool and then cured in an autoclave with simultaneous application of pressure and temperature.

Figure 6:
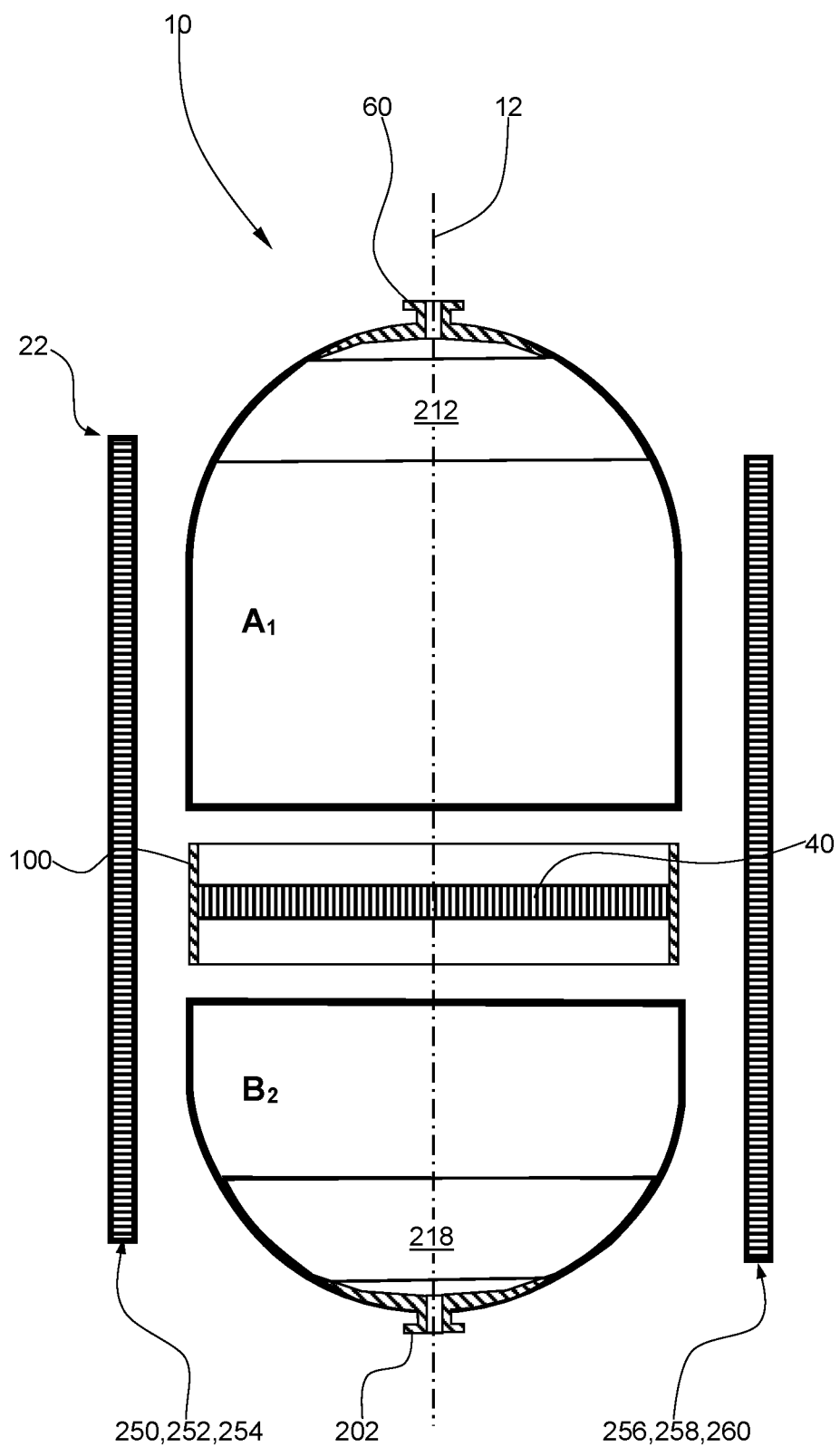

FIG. 6 illustrates the further progress of the method until final completion using the example of tank 10 in FIG. 1.

First, the first tank component A1 of the first tank blank, the second tank component B2 of the second tank blank, as well as the connection sleeve 100 positioned in between with the evacuable separation bulkhead 40 are aligned along the longitudinal center axis 12, wherein the tank components A1, B2 can already be coaxially surrounded by the six sandwich segments 250 to 260 for the creation of the later evacuable sandwich structure 22. Similarly, the second tank component A2 of the first tank blank and the first tank component B1 of the second tank blank as well as another separation bulkhead with a connection sleeve are combined with each other for producing the second tank (not shown).

Figure 7:
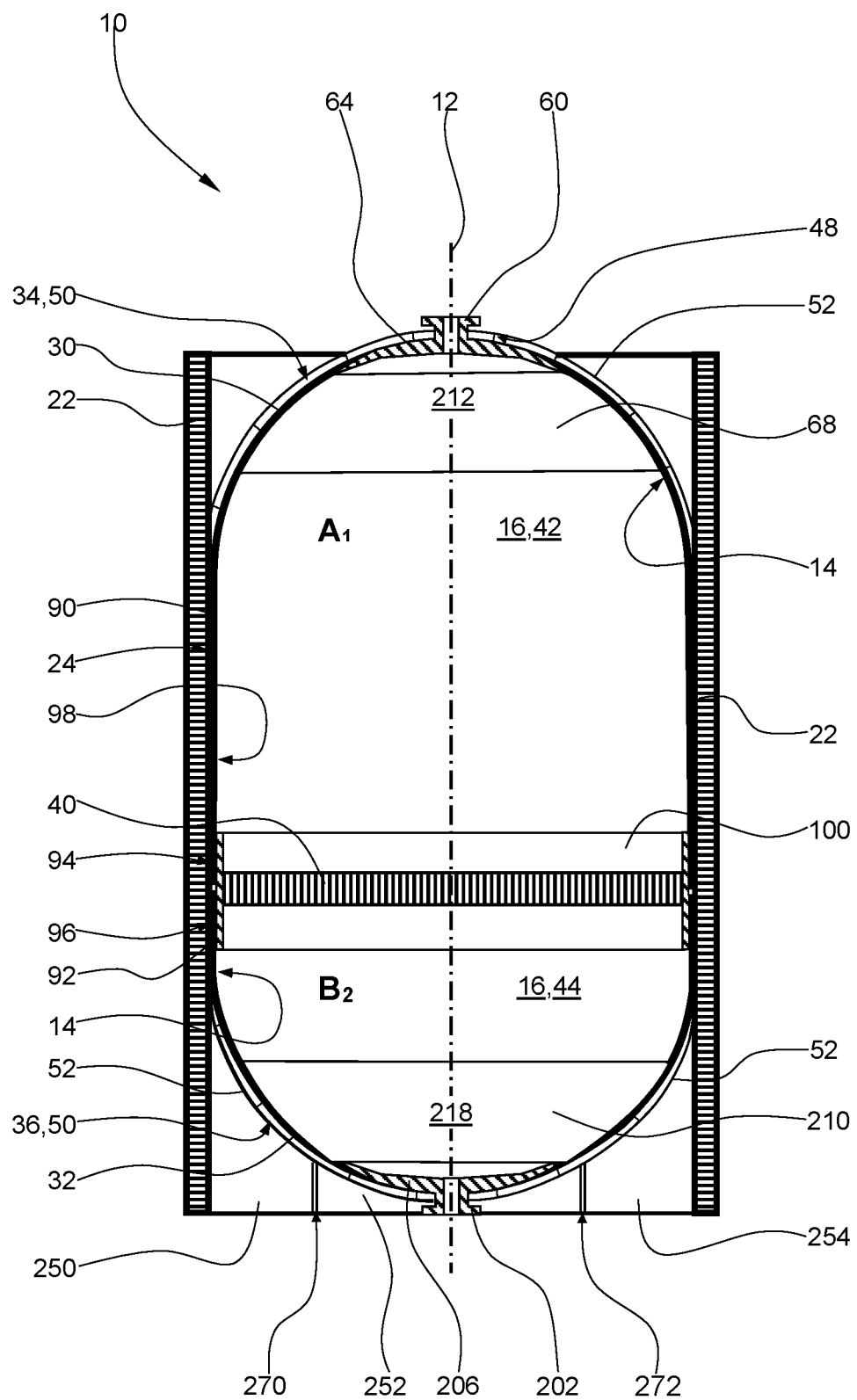

FIG. 7 shows the joined tank 10 starting from the FIG. 6.

The tank 10, which is 12 rotationally symmetrical in relation to the longitudinal central axis, is constructed here by the joining of the first tank component A1 of the first tank blank and the second tank component B2 of the second tank blank in FIG. 4. The connection assemblies 212, 218, comprising the two connection pieces 60, 202 with the flanges 64, 206 and the connection elements 68, 210 are integrated into the tank 10 before joining the tank components A1 and B2. The extraction line, as well as the compression and decompression line, are not shown here for the sake of a better illustrational overview. The tank components A1 and B2 are joined together by means of the essentially hollow cylindrical connection sleeve 100. For this purpose, the free end sections 94, 96 of the two hollow cylinder sections 90, 92 of the center monolithic circumferential section 24 of the plastic sheathing 14, which are axially positioned essentially for impact, are glued by means of the connection sleeve 100. In addition, connection elements, such as rivets, bolts, clamps, etc. can be provided. The connection sleeve 100 adjoins the inner side 98 of the fiber-reinforced plastic sheathing 14 in the fully assembled state of the tank 10 shown here, and is simultaneously connected to the evacuable separation bulkhead 40, which is designed to be approximately flat or level deviating from the spherically curved embodiment of the tank 10 in FIG. 1. The evacuable separation bulkhead 40 is, for its part, attached on the inside side to the connection sleeve 100. By means of the evacuable separation bulkhead 40, the interior space 16 of the tank 10 is divided into the two chambers 42, 44 in such a way that liquids or gases with different properties are can be stored in the chambers 42, 44.

The evacuable sandwich structure 22 is glued to the two hollow cylinder sections 90, 92 of the center circumferential section 24 of the plastic sheathing 14 at least in sections and extends axially across the hollow cylinder sections 90, 92.

The evacuable sandwich structure 22 is formed with the, here exemplary, six sandwich segments in FIG. 5, of which only three sandwich segments 250, 252, 254 are shown here. Here, the three sandwich segments 250, 252, 254 are illustratively connected with each other in a pressure-tight manner with the aid of two longitudinal seams 270, 272 running parallel to the longitudinal center axis 12 in circumferential direction in such a way that a low-loss evacuation of the entire cylindrical sandwich structure 22 is possible. The other sandwich segments (not drawn in here), are also connected to each other by means of constructively similar longitudinal seams.

The evacuable external structures 34, 36 at the monolithic end-side circumferential sections 30, 32 of the tank 10 are, in turn, formed with the structurally simplified, that is, essentially non-load-bearing sandwich structure 48 with the enveloping membrane 50.

The evacuable external structures 34, 36, the evacuable separation bulkhead 40, as well as the evacuable sandwich structure 22 of the tank allow for an optimal thermal insulation of the two chambers 42, 44 within the tank 10 with a simultaneously reliable explosion protection, since any escaping, highly flammable gases and/or liquids are immediately extracted by means of the vacuum pump (not shown in the drawings) before an flammable gas and/or liquid mixture can form. A second tank (not shown in the drawings) is produced analogously to the procedure described in the context of the explanation of FIGS. 2 to 7 from the second tank component A2 and the first tank component B1 of the tank blanks 230, 232 in FIG. 4.

The invention relates to a tank for the storage of liquid or gaseous substances with a fiber-reinforced plastic sheathing, which limits at least one interior space for holding the materials to be stored. According to the invention, it is provided that at least one circumferential section of the fiber-reinforced plastic sheathing comprises an evacuable sandwich structure, which completely encloses the circumferential section. As a result, the tank has a low weight with a high thermal insulation capacity. Furthermore, a reliable explosion protection of the tank is provided. Furthermore, the invention relates to a method for manufacturing a tank for the storage of liquid or gaseous substances.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 10 tank
12 longitudinal center axis
14 fiber-reinforced plastic sheathing
16 interior space
18 external environment
20 circumferential section
22 evacuable sandwich structure
24 center circumferential section
30 first end-side circumferential section (dome)
32 second end-side circumferential section (dome)
34 evacuable external structure
36 evacuable external structure
40 evacuable separation bulkhead
42 first chamber
44 second chamber
46 sandwich structure (separation bulkhead)
48 sandwich structure (structurally simplified sandwich structure)
50 membrane
52 support structure
60 first connection piece
62 second connection piece
64 flange (pole cap)
66 flange (pole cap)
68 connection element (dome ring)
70 connection element (dome ring)
74 connection line (vacuum pump)
76 white arrow
78 duct
80 duct
82 duct
90 first hollow cylinder section
92 second hollow cylinder section
94 free end section
96 free end section
98 inner side (tank)
100 connection sleeve
102 connection element
104 evacuable core structure (pressure bulkhead)
110 extraction and filling line
112 compression and decompression line
114 black arrow
116 black double arrow
120 guide system (second chamber)
122 vacuum
200 first connection piece
202 second connection piece
204 flange (pole cap)
206 flange (pole cap)
208 connection element (dome ring)
210 connection element (dome ring)
212 connection assembly
214 connection assembly
216 connection assembly
218 connection assembly
230 first tank blank
232 second tank blank
234 longitudinal center axis (first tank blank)
236 longitudinal center axis (second tank blank)
242 section line
250 sandwich segment
252 sandwich segment
254 sandwich segment
256 sandwich segment
258 sandwich segment
260 sandwich segment
262 longitudinal edge
264 longitudinal edge
270 longitudinal seam (sandwich segment)
272 longitudinal seam (sandwich segment)
$D_1$ diameter (tank blanks)
$H_{1,2}$ height (tank blanks)
$A_1$ first tank component (first tank blank)
$A_2$ second tank component (first tank blank)
$B_1$ first tank component (second tank blank)
$B_2$ second tank component (second tank blank)

The invention claimed is:

1. A tank for storage of liquid or gaseous substances, with a fiber-reinforced plastic sheathing, which limits at least one interior space for an accommodation of materials to be stored, wherein at least one circumferential section of the fiber-reinforced-plastic sheathing has an evacuable sandwich structure which completely encloses the circumferential section,
wherein the at least one circumferential section is a center circumferential section, to which a respective one of two end-side circumferential sections adjoins on both sides, which is respectively covered with a respective one of two evacuable external structures,
wherein the interior space is divided by means of an evacuable separation bulkhead for creation of a first and a second chamber, and
wherein the evacuable sandwich structure of the center circumferential section, the evacuable external structures of the two end-side circumferential sections and the evacuable separation bulkhead are connected to each other via aligning holes or ducts, and to at least one connection line for evacuation.

2. The tank according to claim 1 wherein the evacuable sandwich structure is non-detachably connected to the center circumferential section and configured to be load-bearing.

3. The tank according to claim 2, wherein the evacuable external structures of the two end-side circumferential sections are formed with at least one of a spaced-away membrane and a support structure built with a fiber-composite plastic.

4. The tank according to claim 1 wherein each of the two end-side circumferential sections respectively comprises a connection piece with a flange directed in a direction of the interior space, wherein the flanges are each non-detachably connected to the respectively associated end-side circumferential section by means of a connection element made using a glass-fiber reinforced plastic.

5. The tank according to claim 1, wherein the center circumferential section comprises a first hollow cylinder section and a second hollow cylinder section, whose free end sections facing towards each other are joined together via a radial inner connection sleeve for the creation of the plastic sheathing, wherein the evacuable separation bulkhead is internally connected to the connection sleeve.

6. The tank according to claim 1, wherein the end-side circumferential sections are formed integrally with the center circumferential section and are each directed away from the connection sleeve and are essentially dome-shaped.

7. The tank according to claim 1, wherein the first chamber comprises an extraction and filling line and the second chamber comprises a compression and decompression line.

8. The tank according to claimer 1, wherein the evacuable sandwich structure of the center circumferential section, the evacuable external structures of the end-side circumferential sections, as well as the evacuable separation bulkhead comprise at least one of electrical or optical cables and sensors.

9. The tank according to claim 1, wherein at least the evacuable sandwich structure of the center circumferential section is modified, where enclosing an evacuable or evacuated hollow, by means of at least one of optical coatings, a multilayer insulation and an opacifier, in such a way that a heat transport by radiation is reduced.

\* \* \* \* \*